Patented Dec. 20, 1938

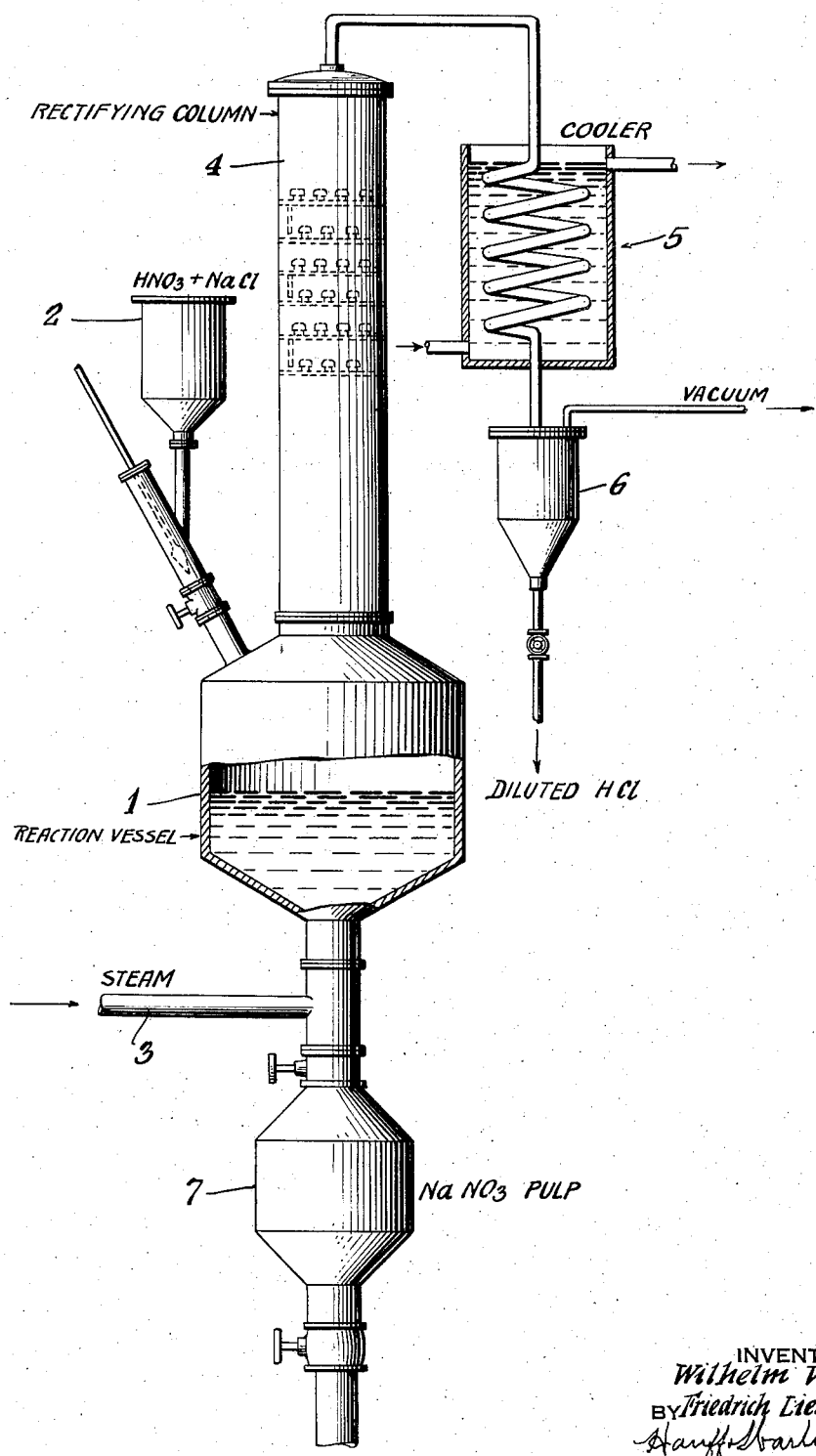

2,140,726

UNITED STATES PATENT OFFICE 2,140,726

ALKALI METAL AND AMMONIUM NITRATES

Wilhelm Wild and Friedrich Lieseberg, Ludwigshafen-on-the-Rhine, Germany

Application April 9, 1934, Serial No. 719,745
In Germany April 15, 1933

6 Claims. (Cl. 23—102)

The present invention relates to the production of alkali metal and ammonium nitrates.

The commercial manufacture of alkali metal nitrates by the reaction of alkali metal chlorides with nitric acid offers considerable difficulty, in particular because of the loss of nitric acid in the form of nitric acid vapor or nitrosyl chloride readily occurring. Numerous proposals have already been made for obviating the said difficulty. For example according to one method dilute nitric acid containing less than 35 per cent of $HNO_3$ is employed, the reaction is carried out at temperatures not exceeding 80 C. and the evaporation is preferably effected under reduced pressure. The carrying out of this method in practice is very difficult, however, because the usual evaporation apparatus is not capable of withstanding for long the simultaneous action of hydrochloric and nitric acids.

According to a more recent method, aqueous nitric acid in the form of vapor is allowed to act at temperatures of from about 110° to about 130° C. on alkali metal chloride in the form of pieces or grains or in the form of an aqueous solution spread out in thin layers. For example for the reaction of sodium chloride, a mixture of 1 part of nitric acid and 13 parts of steam (by weight) is employed. The strongly pronounced tendency at these high temperatures to form oxides of nitrogen, chlorine and nitrosyl chloride is suppressed by the presence of considerable amounts of steam. The employment of large amounts of steam, the evaporation of the nitric acid and especially the frequent stoppage of the alkali metal chloride towers constitute such disadvantages, however, that this process has found no application commercially.

We have now found that the manufacture and production of nitrates of alkali metals or ammonium by the reaction of alkali metal or ammonium chlorides with nitric acid can be carried out in a smooth manner by wholly or partly dissolving the chlorides in aqueous nitric acid, the hydrochloric acid formed, and if desired nitric acid, being expelled from the liquid reaction mixture by distillation under reduced pressure with steam which is preferably superheated. Owing to the simultaneous introduction of steam and working under reduced pressure, for example under a pressure of 30 millimetres of mercury, the hydrochloric acid is carried away rapidly from the reaction mixture and the formation of nitrosyl chloride is avoided to a large extent. A special advantage of the process according to this invention as compared with one of the beforementioned methods consists in the fact that the expenditure of heat for the evaporation of the nitric acid is dispensed with and that there is also a saving in steam. By reason of the direct supply of heat through the steam, it is not necessary to employ metallic vessels capable of transferring heat from an external source, but acid-proof brickwork vessels may be employed whereby the difficulties as regards materials hereinbefore mentioned are obviated. Since no towers charged with solid alkali metal chloride are required according to this invention, all the difficulties accompanying the use of such towers, in particular the danger of stoppage by fouling of the tower, are avoided.

The nitric acid may be employed in any concentration; for example the acid obtainable in modern nitric acid plant, containing about 50 per cent nitric acid, may be directly employed.

The vapors leaving the reaction mixture are preferably led through a rectifying column for the recovery of the fraction of nitric acid at first distilled therewith. Water or a solution of the components taking part in the reaction may be sprayed into the rectifying column to promote the condensation of the nitric acid; the condensate from the column may be either returned to the reaction vessel or collected separately. The mixture of steam and hydrochloric acid leaving the column may be condensed in stages, a comparatively strong hydrochloric acid being obtained; the uncondensed fraction, which consists mainly of pure steam, may be returned, preferably after it has been superheated, to the distillation vessel and used again for expelling hydrochloric acid.

In the reaction vessel there remains a solution of alkali metal or ammonium nitrate which contains only a slight amount of free acid and in some cases already contains solid alkali metal or ammonium nitrate; it may be worked up in the usual manner.

The process according to this invention may also be employed with advantage with solutions containing hydrochloric acid, nitric acid and alkali metal or ammonium chlorides obtained by decomposing alkali metal or ammonium chlorides by means of nitric acid in such concentration that the alkali metal or ammonium nitrate formed separates in solid form immediately or on cooling.

The following examples, together with the accompanying drawing, will further illustrate how the said invention may be carried out in practice but the invention is not restricted to these examples. The parts are by weight.

*Example 1*

165 parts of sodium chloride are introduced together with 500 parts of 46 per cent nitric acid through the funnel 2 into an acid-proof vacuum vessel 1 provided with a rectifying column 4, superheated steam being blown in through pipe 3 while the whole apparatus is kept under an absolute pressure of about 30 millimetres (mercury gauge); the temperature in the reaction vessel amounts to from 45° to 50° C. The mixture of steam, hydrochloric acid and nitric acid escaping from the reaction vessel is rectified in the column 4 so that the greater part of the nitric acid carried along with it flows back into the reaction vessel and only small fractions remain in the mixture of steam and hydrochloric acid leaving the top of the column. The effluent vapors are condensed in a cooler 5 and the condensate is collected in the vessel 6.

The salt pulp remaining in the reaction vessel at the end of the distillation contains 227 parts of sodium nitrate, 45 parts of free nitric acid and 8.5 parts of sodium chloride. The pulp can be removed from the reaction vessel by means of the sluicing vessel 7. Thus 94.85 per cent of the sodium chloride is converted into sodium nitrate. The yield on the basis of the nitric acid amounts, having regard to the free acid still present, to 92.7 per cent. After separating the sodium nitrate by filtration or centrifuging the mother liquor is added to a fresh batch; then in the succeeding conversions the amount of sodium chloride is reduced to 156.5 parts and the amount of 46 per cent nitric acid to 402 parts.

*Example 2*

Superheated steam is blown into a mixture of 150 parts of ammonium chloride and 595 parts of a 36 per cent nitric acid in a vacuum vessel as described in Example 1 under a pressure of about 20 millimetres (mercury gauge); the temperature in the reaction vessel is between about 45° and 50° C. The mixture of steam, hydrochloric acid and nitric acid is rectified in the manner described in Example 1.

The salt pulp remaining in the vessel contains 202 parts of ammonium nitrate, 34 parts of free nitric acid and 7.5 parts of ammonium chloride. 95 per cent of the ammonium chloride is converted into ammonium nitrate. The yield on the basis of nitric acid is 90 per cent. The ammonium nitrate is separated by filtering or centrifuging from the mother liquor which is used in a new batch in which the amount of ammonium chloride is reduced to 142.5 parts and the amount of 36 per cent nitric acid to 515 parts.

The ammonium chloride need not be completely dissolved in the nitric acid or the mother liquor if such be employed for making up a fresh batch. The nitric acid which may be employed in the equivalent amount or a moderate excess, may be run in continuously or periodically in the course of the reaction, in the course of several hours, if so desired. The hydrochloric acid expelled may be utilized while still in the form of vapor, or after condensation, for example for the solubilization of phosphates.

What we claim is:—

1. A process for the manufacture and production of alkali metal and ammonium nitrates by the conversion of alkali metal or ammonium chlorides with nitric acid which comprises introducing steam into the reaction mixture while maintaining a pressure of about 20 to 30 millimetres of mercury and thus rapidly removing the hydrochloric acid generated.

2. A specific method of carrying out the process as claimed in claim 1 which consists in employing superheated steam.

3. A modification of the process of making sodium nitrate which consists in mixing sodium chloride with aqueous nitric acid, introducing steam into the reaction mixture while maintaining a pressure of about 20 to 30 millimetres of mercury and thus rapidly removing the hydrochloric acid generated, fractionally condensing the vapors and thereby producing a fraction containing the bulk of nitric acid carried over with the hydrochloric acid and a fraction containing aqueous hydrochloric acid and practically pure water.

4. A specific method of carrying out the process as claimed in claim 3 which consists in employing superheated steam.

5. A process for the manufacture and production of alkali metal and ammonium nitrates by the conversion of alkali metal or ammonium chlorides with nitric acid which comprises introducing steam into the reaction mixture while maintaining a pressure of about 20 to 30 millimetres of mercury and thus rapidly removing the hydrochloric acid generated, fractionally condensing the expelled acid vapors and allowing the nitric acid carried over and so condensed to flow back into the salt mixture.

6. A specific method of carrying out the process as claimed in claim 5 which consists in employing superheated steam.

WILHELM WILD.
FRIEDRICH LIESEBERG.